UNITED STATES PATENT OFFICE.

JOHN RIDDELL, OF SCHENECTADY, NEW YORK, ASSIGNOR TO GENERAL ELECTRIC COMPANY, A CORPORATION OF NEW YORK.

BEARING.

1,176,603.   Specification of Letters Patent.   Patented Mar. 21, 1916.

No Drawing.   Application filed October 20, 1913. Serial No. 796,338.

*To all whom it may concern:*

Be it known that I, JOHN RIDDELL, a citizen of the United States, residing at Schenectady, in the county of Schenectady, State of New York, have invented certain new and useful Improvements in Bearings, of which the following is a specification.

My invention relates to bearings and bearing surfaces, and its object is to provide metallic bearings or bearing surfaces of superior running and wearing qualities and of relatively low cost.

The invention is applicable to shafts; to journal boxes, to cylinders, pistons, and piston rings of internal combustion or other engines; and to the wearing surfaces of other relatively movable parts.

Various advantages besides those already mentioned that can be realized in connection with my invention will hereinafter become apparent, and its scope will be indicated in my claims.

In accordance with my invention, bearing parts of metallic materials which, though in some respects suitable or desirable for bearings, are otherwise either initially or permanently more or less unsatisfactory for the purpose, are rendered entirely satisfactory or greatly improved by a surface stratum in which other metallic material is intimately incorporated. This incorporation of other material at the bearing surface may even, indeed, be such that the initially exposed surface shall be that of an appreciably thick layer or stratum consisting wholly of such other material; but whether this is so or not, the union between the metal of the bearing part as a whole and that superficially incorporated with it must always be a very intimate one. I am at present of the opinion that this intimacy of union can only be obtained when alloying is caused to occur between the superficially added metal and that of the bearing part itself,—so that when there is a distinct surface layer or stratum of such metal the same will be, as it were, anchored or bonded to the underlying metal of the bearing parts by a sub-stratum of some sort of alloy,—the term "alloy" being here used in its inclusive popular sense of an intimate union of different metals such as can in many cases be produced by heat, rather than in any strict and limited technical sense. Such coatings as can at present be produced by electroplating methods are entirely unsuitable for the purposes of my invention by reason of their sponginess, their insufficient adhesion to the underlying metal, etc.

In particular, bearing parts of various sorts of ferrous metal can be materially improved by means of my invention. Moreover, I have found that peculiar and especially advantageous results can be obtained by coating the bearing surfaces of cast iron journal boxes or bearings for steel shafts with zinc when the coating is effected by heating the bearings to a suitable temperature in contact with very finely divided zinc or zinc dust; and as a sherardized gray cast iron bearing for a steel shaft exhibits the important features and advantages of my invention very clearly, I will hereinafter describe in detail, the preparation of such a bearing.

Assuming that bearings for a motor shaft of, say, $2\frac{1}{4}''$ to $3''$ diameter are to be made in accordance with my invention, gray iron castings such as would be used for ordinary cast iron bearings intended to be run without babbitt or other special metal bearing surfaces are roughly bored or reamed out and are then annealed at about a bright red heat. The object of this annealing is to insure against distortion in the subsequent heat treatment by which the zinc is applied. After annealing, the interior of the bearing is finally reamed and finished as usual for cast iron bearings, but about 5/1000 of an inch larger in diameter than the shafts for which they are intended. These bearings are then heated in zinc dust in a tightly closed revolving box or cylinder at about the dull red heat of iron or somewhat higher for from three to four hours or more. This sherardizing treatment may be carried out in any type of furnace in which a uniform heat of this temperature can be maintained, —as, for example, in that shown in U. S. Patent 1,034,930 granted to me August 6th, 1912. At the end of the heating, the cylinder or box is allowed to cool to about 200° C. before being opened, to prevent the zinc dust from catching fire. The bearings may then be reamed out again with a full size reamer,—although this is not strictly necessary, especially with relatively small bearings.

The result of the procedure described will be to coat with zinc the exterior of the bearing as well as its bearing or running surface proper, especially if the exterior has previously been well cleaned by sand blasting, pickling, or the like. This complete coating offers the advantage of protecting the exterior of the bearing from rust under all conditions, and it is also practically easier and cheaper than coating only a part of the surface; but if for any reason it is desired that some part of the surface (such as a ball seat) should not be coated, this can be avoided by the application thereto prior to the sherardizing of fire clay worked up with a little water.

The sherardizing operation should be so carried out that the coating formed on the interior or running surface of the bearing will be from two to two and one-half thousandths of an inch thick, or over. If circumstances require it, the temperature or the duration of the heat treatment should be made greater or less so that a coating of about this thickness will still be obtained; in dealing with large bearing parts, in particular, the temperature or duration of the heating may need to be increased. For the best results as regards the behavior of the bearings in service, the procedure should be so conducted (having regard to the particular zinc dust employed, etc.) that the coating will be firm, close, and dense rather than loose or porous.

The sherardized bearing surface appears to comprise an outer layer or stratum of zinc anchored to the cast iron beneath by an intermediate stratum comprising alloyed zinc and iron, this latter stratum consisting partly of zinc alloyed with iron (toward the outside) and partly of iron penetrated and alloyed with zinc (deeper in),—the penetration and alloying of the iron with the zinc being facilitated by the porosity of the iron. At any rate, the union between the zinc surface and the iron beneath is a very firm and intimate one, so that the bearing possesses in a high degree all the qualities that I have indicated above as requisite for securing the advantages of my invention. The zinc coat will probably always contain zinc oxid from the zinc dust used in producing it; but if the sherardizing conditions have been such as to yield a good coating of the character hereinbefore described, this will do no harm.

In use, the sherardized bearing will be found entirely free from many or all of the objections to which ordinary cast iron bearings are initially subject,—such as excessive friction, a tendency to heat or score, and the necessity for profuse lubrication. The cost of such a bearing is, moreover, very low in comparison with bronze, babbitt, or other similar bearings. The zinc coating produced as described is perfectly uniform and free from globules, ridges or unevennesses of any sort, so that it requires no real finishing; the coefficient of friction between the sherardized surface and an ordinary steel shaft is perfectly satisfactory; the bearing is adapted for higher running speeds; and the wearing qualities are excellent. Scratching and scoring of either the shaft or the bearing or journal—such as is liable to occur with a new plain cast iron surface—are effectually prevented throughout the life of the bearing. This may be due to one or both of the causes: either that after the initial bearing surface consisting entirely of zinc is worn away the loose particles of iron and of carbon which the surfaces of cast iron bearings always present when newly finished are still held fast by the zinc (or some alloy thereof with the iron) which fills the pores of the latter; or else that the loose iron and carbon particles near the surface may respectively be eliminated by alloying and diffusion into the zinc and by reaction with the zinc oxid present in the zinc dust. However this may be, I find that by the time the bearing is worn down to the plain cast iron the latter will have the well-worn and polished surface that is characteristic of a cast iron bearing after its initial critical period is past, so that the final disappearance of the zinc will not impair the bearing's initial good qualities in the least.

What I claim as new and desire to secure by Letters Patent of the United States, is:—

1. A bearing of ferrous metal having its bearing surface improved by superficial incorporation and alloying of other metal thereinto.

2. A bearing of porous metal having its bearing surface improved and the pores therein filled by superficial incorporation and alloying of other metal in said surface.

3. A bearing of metal having its bearing surface improved by superficial incorporation and alloying of zinc thereinto.

4. As an article of manufacture, a bearing of ferrous metal having on its bearing surface a thin coating of zinc anchored in place by alloying with the ferrous metal.

5. As an article of manufacture, a bearing of ferrous metal having on its bearing surface a coating of other metal formed *in situ* and anchored in place by alloying with the ferrous metal, said coating being so thin as to wear away completely during the useful life of the bearing.

6. A bearing of cast iron having its bearing surface improved in superficial alloying and incorporation thereinto of an amount of zinc such as to wear away and disappear completely during the useful life of the bearing.

7. As an article of manufacture, a bearing of gray cast iron having on its bearing surface a coating of other metal anchored in place of alloying with the iron and so thin as to wear away completely during the useful life of the bearing.

8. A bearing of ferrous metal having a sherardized bearing surface.

9. A bearing of gray cast iron having a sherardizing bearing surface.

In witness whereof, I have hereunto set my hand this 18th day of October, 1913.

JOHN RIDDELL.

Witnesses:
ROBERT REID,
HELEN ORFORD.

It is hereby certified that in Letters Patent No. 1,176,603, granted March 21, 1916, upon the application of John Riddell, of Schenectady, New York, for an improvement in "Bearings," errors appear in the printed specification requiring correction as follows: Page 2, line 78, for the word "the", first occurrence, read *two;* same page, line 123, claim 6, for the word "in" read *by;* same page, line 129, claim 7, and page 3, line 6, claim 9, for the word "gray" read *grey;* page 3, line 1, claim 7, for the word "of" read *by;* same page, line 7, claim 9, for the word "sherardizing" read *sherardized;* and that the said Letters Patent should be read with these corrections therein that the same may conform to the record of the case in the Patent Office.

Signed and sealed this 27th day of June, A. D., 1916.

[SEAL.]

R. F. WHITEHEAD,
*Acting Commissioner of Patents.*